(12) United States Patent
Okamoto et al.

(10) Patent No.: US 9,471,965 B2
(45) Date of Patent: Oct. 18, 2016

(54) IMAGE PROCESSOR AND IMAGE PROCESSING METHOD

(71) Applicant: MegaChips Corporation, Osaka-shi (JP)

(72) Inventors: Akira Okamoto, Osaka (JP); Takuya Sawada, Osaka (JP); Hideki Daian, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/869,096

(22) Filed: Sep. 29, 2015

(65) Prior Publication Data

US 2016/0093027 A1 Mar. 31, 2016

(30) Foreign Application Priority Data

Sep. 30, 2014 (JP) .................................. 2014-202326
Sep. 30, 2014 (JP) .................................. 2014-202327
Sep. 30, 2014 (JP) .................................. 2014-202328

(51) Int. Cl.
*G06K 9/40* (2006.01)
*G06T 5/00* (2006.01)
*G06T 5/50* (2006.01)
*G06K 9/46* (2006.01)
*G06T 5/10* (2006.01)

(52) U.S. Cl.
CPC ............. *G06T 5/002* (2013.01); *G06K 9/4609* (2013.01); *G06T 5/10* (2013.01); *G06T 5/50* (2013.01); *G06T 2207/10016* (2013.01); *G06T 2207/10024* (2013.01); *G06T 2207/20016* (2013.01); *G06T 2207/20182* (2013.01); *G06T 2207/20192* (2013.01)

(58) Field of Classification Search
USPC ....... 382/266, 264, 275, 260, 254, 199, 195, 382/261, 218, 278, 294, 298; 235/455, 235/462.01, 462.32; 348/630, 631; 356/73.1, 237.2; 358/1, 2, 3.24, 3.27, 358/451; 378/4
See application file for complete search history.

(56) References Cited

U.S. PATENT DOCUMENTS 5,179,419 A * 1/1993 Palmquist ............ G01N 21/952
356/237.2

(Continued)

FOREIGN PATENT DOCUMENTS

JP 2009-025862 2/2009

*Primary Examiner* — Anh Do
(74) *Attorney, Agent, or Firm* — Oblon, McClelland, Maier & Neustadt, L.L.P.

(57) ABSTRACT

A first edge strength calculation circuit calculates an edge strength of each pixel in the image on the basis of results of detection by the first edge detection circuit. A filter strength setting unit sets a filter strength of a two-dimensional lowpass filter for each pixel, on the basis of the edge strength calculated by the edge strength calculation circuit. A second edge strength calculation circuit calculates an edge strength of each pixel in the image, on the basis of results of detection by the second edge detection circuit. An enhancement strength setting circuit sets an edge enhancement strength of the edge enhancement filter for each pixel, on the basis of the edge strength calculate by the second edge strength calculation circuit.

16 Claims, 5 Drawing Sheets

(56) References Cited

U.S. PATENT DOCUMENTS

| | | | | |
|---|---|---|---|---|
| 6,164,540 A * | 12/2000 | Bridgelall | G06K 7/10851 | 235/455 |
| 6,209,788 B1 * | 4/2001 | Bridgelall | G06K 7/10851 | 235/462.01 |
| 7,155,069 B2 * | 12/2006 | Ishizaka | G06T 3/403 | 358/1.2 |
| 7,664,326 B2 * | 2/2010 | Tamura | G06T 5/20 | 382/199 |
| 7,738,044 B2 * | 6/2010 | Arici | H04N 9/646 | 348/630 |
| 8,055,075 B1 * | 11/2011 | Tamura | G06T 5/20 | 382/199 |

\* cited by examiner

IMAGE PROCESSOR AND IMAGE PROCESSING METHOD

CROSS REFERENCE TO RELATED APPLICATIONS

The present application is based on, and claims priority from Japanese Patent Application Serial Numbers 2014-202326, 2014-202327, and 2014-202328, the disclosure of which is hereby incorporated by reference herein in its entirety.

BACKGROUND

1. Technical Field

The present disclosure relates to an image processor and an image processing method.

2. Related Art

JP2009-25862A describes an image processor that detects an edge value for each pixel in an input image and changes a filter to apply among multiple enhancement filters depending on the detected edge value. JP2009-25862A further describes an image is smoothed first and then edge value detection is performed, so as to achieve reliable edge value detection with little effect of noise.

SUMMARY

The present disclosure is directed to an image processor including a denoising circuit configured to remove noise from an image and an edge enhancement circuit connected in a stage subsequent to the denoising circuit and configured to enhance an edge in the image. The denoising circuit includes a lowpass filter configured to remove noise from the image, a first edge detection circuit configured to detect an edge in the image, a first edge strength calculation circuit configured to calculate an edge strength of each pixel in the image based on a result of detection by the first edge detection circuit, and a first filter strength setting circuit configured to set a filter strength of the lowpass filter for each pixel, based on the edge strength calculated by the first edge strength calculation circuit. The edge enhancement circuit includes an edge enhancement filter configured to enhance an edge in the image, a second edge detection circuit configured to detect the edge in the image, a second edge strength calculation circuit configured to calculate an edge strength of each pixel in the image, based on a result of detection by the second edge detection circuit, and an enhancement strength setting circuit configured to set an edge enhancement strength of the edge enhancement filter for each pixel, based on the edge strength calculated by the second edge strength calculation circuit.

The present disclosure is also directed to an image processing method including removing noise from an image, and enhancing an edge in the image after the removing noise. The removing noise includes removing noise from the image by a lowpass filter, detecting an edge in the image, calculating an edge strength of each pixel in the image based on a result of detection in the detecting an edge in the removing noise, and setting a filter strength of the lowpass filter for each pixel, based on the edge strength calculated in the calculating an edge strength in the removing noise. The enhancing an edge includes enhancing the edge in the image by an edge enhancement filter, detecting the edge in the image; calculating an edge strength of each pixel in the image, based on a result of detection from the detecting the edge in the enhancing an edge, and setting an edge enhancement strength of the edge enhancement filter for each pixel, based on the edge strength calculated in the calculating an edge strength in the enhancing an edge.

These and other objects, features, aspects, and advantages of the present disclosure will become more apparent from the following detailed description when taken in conjunction with the accompanying drawings.

DETAILED DESCRIPTION

Figure 1:
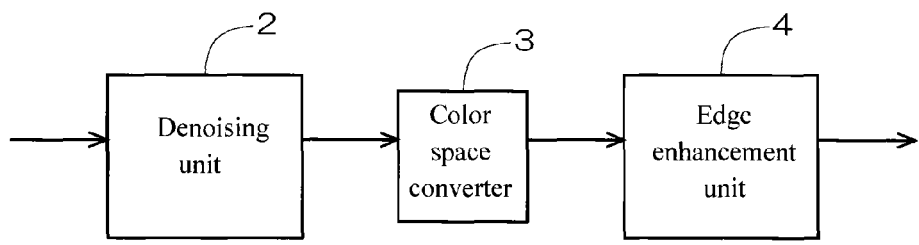
FIG. 1 is a diagram illustrating a configuration of an image processor according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

According to the image processor described in JP2009-25862A, when the effect of smoothing prior to edge enhancement is excessive, edge is also smoothed, thus appearing blurred in the enhanced image. On the other hand, when the effect of smoothing prior to edge enhancement is inadequate, noise is not removed completely, and thus is also enhanced during edge enhancement. Thus the image processor described in JP2009-25862A may smooth an image first and then detect an edge value, but still finds difficulty in achieving both noise suppression and edge enhancement efficiently.

The present disclosure is directed to obtaining image processor and image processing method that achieve both noise suppression and edge enhancement efficiently.

According to an aspect of an image processor, a first edge detection circuit is configured to detect an edge in an image, and a first edge strength calculation circuit is configured to calculate an edge strength of each pixel in the image based on a result of detection by the first edge detection circuit. The first filter strength setting circuit is configured to set a filter strength of a lowpass filter for each pixel based on the edge strength calculated by the first edge strength calculation circuit. This achieves adaptive change of the filter strength of the lowpass filter for each pixel, depending on the edge strength of each pixel. For example, the filter strength for pixels belonging to a flat area of the image is set relatively high, which removes noise efficiently, while the filter strength of pixels belonging to an edge area of the image is set relatively low, which helps avoid smoothing of edges. Thus edge enhancement is performed by the edge enhancement circuit on the image from which noise has been efficiently removed by the denoising circuit, which helps avoid enhancement of noise in edge enhancement. Consequently, noise suppression and edge enhancement are both achieved efficiently.

A second edge detection circuit is configured to detect an edge in the image. A second edge strength calculation circuit is configured to calculate an edge strength of each pixel in the image based on a result of detection by the second edge detection circuit. An enhancement strength setting circuit is configured to set an edge enhancement strength of the edge enhancement filter for each pixel based on the edge strength calculated by the second edge strength calculation circuit. This achieves adaptive change of the enhancement strength of the enhancement strength of the edge enhancement filter for each pixel depending on the edge strength of each pixel. For example, the enhancement strength for pixels belonging to a flat area of the image is set relatively low, which helps avoid enhancement of residual noise, while the enhancement strength for pixels belonging to an edge area of the image is set relatively high, which effectively enhances the edge. Consequently, since enhancement of noise is avoided while edges are enhanced, noise suppression and edge enhancement are both achieved efficiently.

In some embodiments, the first filter strength setting circuit is configured to set the filter strength for a pixel to a first filter strength if the pixel has an edge strength lower than a first threshold and belongs to a flat area of the image, and set the filter strength for a pixel to a second filter strength lower than the first filter strength if the pixel has an edge strength higher than or equal to the first threshold and belongs to an edge area of the image.

According to such embodiments, the filter strength for pixels belonging to a flat area of the image is set to a relatively high first filter strength, which removes noise in the flat area efficiently. The filter strength for pixels belonging to an edge area of the image is set to a relatively low second filter strength, which helps avoid smoothing of edges. Consequently, in denoising, smoothing of edges is avoided while noise in the flat area is removed efficiently.

In some embodiments, the first filter strength setting circuit is configured to set the filter strength for a pixel to a third filter strength lower than the second filter strength if the pixel has an edge strength higher than or equal to the second threshold and belongs to an exceptional area of the image.

According to such embodiments, the filter strength for pixels belonging to an exceptional area of the image such as a reflection area of a light source is set to a third filter strength lower than the second filter strength, which helps avoid smoothing of exceptional areas. Consequently, blurring of an exceptional area to render the image artificial is avoided in advance.

In some embodiments, the first filter strength setting circuit is configured to set the second filter strength depending on the edge strength so as to decrease with an increase in edge strength if the pixel belongs to an edge area.

According to such embodiments, the first filter strength setting circuit is configured to set the second filter strength depending on the edge strength so as to decrease with an increase in edge strength if the pixel belongs to an edge area. Such minute control of the second filter strength depending on the edge strength achieves smooth change of the filter strength of the lowpass filter, in comparison with setting a uniform filter strength for the whole edge area. This avoids rendering the image artificial.

In some embodiments, the denoising circuit further includes a frequency analyzing circuit configured to analyze a spatial frequency of the edge based on a result of detection by the first edge detection circuit and a range setting circuit configured to set an allowable range of the filter strength of the lowpass filter for each image based on a result of analysis by the frequency analyzing circuit. The first filter strength setting circuit is configured to set the filter strength of the lowpass filter for each pixel within the allowable range set by the range setting circuit, based on the edge strength calculated by the first edge strength calculation circuit.

According to such embodiments, the frequency analyzing circuit is configured to analyze a spatial frequency of the edge based on a result of detection by the first edge detection circuit. The range setting circuit is configured to set an allowable range of the filter strength of the lowpass filter for each image based on a result of analysis by the frequency analyzing circuit. The first filter strength setting circuit is configured to set the filter strength of the lowpass filter for each pixel within the allowable range set by the range setting circuit, based on the edge strength calculated by the first edge strength calculation circuit. This achieves adaptive change of the allowable range of the filter strength of the lowpass filter for each image depending on spatial frequencies of edges.

In some embodiments, the range setting circuit is configured to set the allowable range so as to distribute the filter strength in a relatively high range if the spatial frequency of the edge centers on a relatively low frequency domain in the image, and set the allowable range so as to distribute the filter strength in a relatively low range if the spatial frequency of the edge centers on a relatively high frequency domain in the image.

According to such embodiments, for an image in which spatial frequencies of edges center on a relatively low frequency domain (image including many flat areas), an allowable range is set so that the filter strength is distributed in a relatively high range, which removes noise in flat areas efficiently. For an image in which spatial frequencies of edges center on a relatively high frequency domain (image including many middle- to high-frequency edges), an allowable range is set so that the filter strength is distributed in a relatively low range, which helps avoid smoothing of edges. Consequently, in denoising, smoothing of edges is avoided while noise in the flat area is removed efficiently.

In some embodiments, the edge enhancement circuit further includes a variation calculation circuit configured to calculate a variation in the image, based on chronologically successive images. The enhancement strength setting circuit is configured to set the edge enhancement strength of the edge enhancement filter for each pixel, based on the edge strength calculated by the second edge strength calculation circuit and the variation calculated by the variation calculation circuit.

According to such embodiments, the variation calculation circuit is configured to calculate a variation in the image, based on chronologically successive images. The enhancement strength setting circuit is configured to set the edge enhancement strength of the edge enhancement filter for each pixel, based on the edge strength calculated by the second edge strength calculation circuit and the variation calculated by the variation calculation circuit. This achieves adaptive change of the enhancement strength of the edge enhancement filter for each pixel depending on the edge strength of each pixel and the variation in the image.

In some embodiments, the enhancement strength setting circuit is configured to set the enhancement strength for a pixel to a first enhancement strength if the pixel has an edge strength lower than a first threshold and belongs to a flat area of the image, and set the enhancement strength for a pixel to a second enhancement strength higher than the first enhancement strength if the pixel has an edge strength higher than or equal to the first threshold and belongs to an edge area of the image.

According to such embodiments, the enhancement strength for pixels belonging to a flat area of the image is set to a relatively low first enhancement strength, which helps avoid enhancement of noise in the flat area. The enhancement strength for pixels belonging to an edge area of the image is set to a relatively high second enhancement strength, which effectively enhances edges. Consequently, in edge enhancement, enhancement of noise is avoided while edges are enhanced.

In some embodiments, the enhancement strength setting circuit is configured to set the first enhancement strength depending on the edge strength so as increase with an increase in edge strength if the pixel belongs to a flat area adjacent to an edge area.

According to such embodiments, the enhancement strength setting circuit is configured to set an enhancement strength for pixels belonging to a flat area adjacent to an edge area to a first enhancement strength depending on the edge strength so that the enhancement strength increases with an increase in edge strength. Such minute control of the first enhancement strength for a boundary area between edge and flat areas depending on the edge strength achieves smooth change of the enhancement strength of the edge enhancement filter, in comparison with setting a uniform enhancement strength for the whole flat area. This avoids rendering the image artificial in a boundary area between edge and flat areas.

In some embodiments, the enhancement strength setting circuit is configured to set the enhancement strength for a pixel to the second enhancement strength if the pixel belongs to an edge area of the image in which the variation is smaller than a predetermined value, and set the enhancement strength for a pixel to a third enhancement strength higher than the second enhancement strength if the pixel belongs to an edge area of the image in which a variation is greater than or equal to the predetermined value.

According to such embodiments, in setting an enhancement strength for pixels belonging to an edge area, the enhancement strength for an image in which the variation is greater than or equal to a predetermined value (image with a large motion) is set to an enhancement strength higher than that of an image (image with a small motion) in which the variation is smaller than the predetermined value, which helps avoid blurred edges due to motion.

In some embodiments, the enhancement strength setting circuit is configured to set the enhancement strength for a pixel to a fourth enhancement strength higher than the second enhancement strength if the pixel has an edge strength higher than or equal to the second threshold and belongs to an exceptional area of the image.

According to such embodiments, the enhancement strength for pixels belonging to an exceptional area of the image such as a reflection area of a light source is set to the fourth enhancement strength higher than the second enhancement strength, which effectively enhances the exceptional area. Consequently, the exceptional area is effectively sharpened.

In some embodiments, the enhancement strength setting circuit is configured to set the enhancement strength for a pixel to the fourth enhancement strength if the pixel belongs to the exceptional area of the image in which the variation is smaller than a predetermined value, and set the enhancement strength for a pixel to a fifth enhancement strength higher than the fourth enhancement strength if the pixel belongs to the exceptional area of the image in which the variation is greater than or equal to the predetermined value.

According to such embodiments, in setting an enhancement strength for pixels belonging to an exceptional area, the enhancement strength for an image in which the variation is greater than or equal to a predetermined value (image with a large motion) is set to an enhancement strength higher than that of an image in which the variation is smaller than the predetermined value (image with a small motion), which helps avoid blurred exceptional areas due to motion.

In some embodiments, the denoising circuit further includes a frequency analyzing circuit configured to analyze a spatial frequency of the edge based on a result of detection by the first edge detection circuit. The edge enhancement circuit further includes a highpass filter connected in a stage preceding the edge enhancement filter and a second filter strength setting circuit configured to set a filter strength of the highpass filter for each image, based on a result of analysis by the frequency analyzing circuit.

According to such embodiments, the highpass filter connected in a preceding stage of the edge enhancement filter helps avoid enhancement of low-frequency noise by the edge enhancement filter. The second filter strength setting circuit is configured to set a filter strength of the highpass filter for each image based on spatial frequencies of edges. This achieves adaptive change of the allowable range of the filter strength of the highpass filter for each image depending on spatial frequencies of edges.

In some embodiments, the second filter strength setting circuit is configured to set the filter strength so as to realize a relatively low cut-off frequency if the spatial frequency of edge centers on a relatively low frequency domain in the image, and set the filter strength so as to realize a relatively high cut-off frequency if the spatial frequency of the edge centers on a relatively high frequency domain in the image.

According to such embodiments, for an image in which spatial frequencies of edges center on a relatively low frequency domain (image including many low-frequency edges), the filter strength is set so as to realize a relatively low cut-off frequency for allowing low-frequency edges to pass through the highpass filter, which achieves enhancement of low-frequency edges by the edge enhancement filter. For an image in which spatial frequencies of edges center on a relatively high frequency domain (image including many middle- to high-frequency edges), the filter strength is set so as to realize a relatively high cut-off frequency for allowing the highpass filter to shut low-frequency noise, which helps avoid enhancement of low-frequency noise by the edge enhancement filter. Middle- to high-frequency edges pass through the highpass filter and thus are effectively enhanced by the edge enhancement filter.

In some embodiments, the denoising circuit is configured to process the image including color data, and the edge enhancement circuit is configured to process the image including luminance and chrominance data.

According to such embodiments, the denoising circuit is configured to process the image including color data (for example, image in Bayer region) and the edge enhancement circuit is configured to process an image including luminance and chrominance data (for example, image of YUV region). Performing such denoising on an image of Bayer region before color space conversion achieves efficient removal of noise in an early stage, and as a consequence, helps prevent noise from propagating during color space conversion.

According to an aspect of an image processing method, an edge is detected in the image, and the edge strength of each pixel in the image is calculated based on a result of detection. A filter strength of the lowpass filter is set for each pixel, based on the calculated edge strength. This achieves adaptive change of the filter strength of the lowpass filter for each pixel, depending on the edge strength of each pixel. For example, the filter strength for pixels belonging to a flat area of the image is set relatively high, which removes noise efficiently, while the filter strength for pixels belonging to an edge area of the image is set relatively low, which helps avoid smoothing of edges. Thus edge enhancement is performed on the image from which noise has been efficiently removed, which helps avoid enhancement of noise in edge enhancement. Consequently, noise suppression and edge enhancement are both achieved efficiently.

Furthermore, the edge in the image is detected, and an edge strength of each pixel in the image based on a result of detection. An edge enhancement strength of the edge enhancement filter is set for each pixel, based on the calculated edge strength. This achieves adaptive change of the enhancement strength of the enhancement strength of the edge enhancement filter for each pixel depending on the edge strength of each pixel. For example, the enhancement strength for pixels belonging to a flat area of the image is set relatively low, which helps avoid enhancement of residual noise, while the enhancement strength for pixels belonging to an edge area of the image is set relatively high, which effectively enhances the edge. Consequently, since enhancement of noise is avoided while edges are enhanced, noise suppression and edge enhancement are both achieved efficiently.

An image processor according to another aspect includes a lowpass filter configured to remove noise from the image, an edge detection circuit configured to detect an edge in the image, an edge strength calculation circuit configured to calculate an edge strength of each pixel in the image based on a result of detection by the edge detection circuit, a frequency analyzing circuit configured to analyze a spatial frequency of the edge based on a result of detection by the edge detection circuit, a range setting circuit configured to set an allowable range of the filter strength of the lowpass filter for each image based on a result of analysis by the frequency analyzing circuit, and a filter strength setting circuit configured to set a filter strength of the lowpass filter for each pixel within allowable range set by the range setting circuit, based on the edge strength calculated by the edge strength calculation circuit.

According to this aspect, the edge detection circuit is configured to detect an edge in an image. The edge strength calculation circuit is configured to calculate an edge strength of each pixel in the image based on a result of detection by the edge detection circuit. The frequency analyzing circuit is configured to analyze a spatial frequency of the edge based on a result of detection by the edge detection circuit. The range setting circuit is configured to set an allowable range of the filter strength of the lowpass filter for each image based on a result of analysis by the frequency analyzing circuit. The filter strength setting circuit is configured to set the filter strength of the lowpass filter for each pixel within the allowable range set by the range setting circuit, based on the edge strength calculated by the edge strength calculation circuit. This achieves adaptive change of the filter strength of the lowpass filter for each pixel, depending on the edge strength of each pixel. For example, the filter strength for pixels belonging to a flat area of the image is set relatively high, which removes noise efficiently, while the filter strength for pixels belonging to an edge area of the image is set relatively low, which helps avoid smoothing of edges. Thus edge enhancement is performed on the image from which noise has been efficiently removed, which helps avoid enhancement of noise in edge enhancement. Consequently, noise suppression and edge enhancement are both achieved efficiently. Furthermore, the allowable range of the filter strength of the lowpass filter is adaptively changed for each image depending on the spatial frequencies of edges. This achieves optimal settings of the allowable range of the filter strength depending on the spatial frequencies of edges.

In some embodiments, the filter strength setting circuit is configured to set the filter strength for a pixel to a first filter strength if the pixel has an edge strength lower than a first threshold and belongs to a flat area of the image, and set the filter strength for a pixel to a second filter strength lower than the first filter strength if the pixel has an edge strength higher than or equal to the first threshold and belongs to an edge area of the image.

According to such embodiments, the filter strength for pixels belonging to a flat area of the image is set to a relatively high first filter strength, which removes noise in the flat area efficiently. The filter strength for pixels belonging to an edge area of the image is set to a relatively low second filter strength, which helps avoid smoothing of edges. Consequently, in denoising, smoothing of edges is avoided while noise in the flat area is removed efficiently.

In some embodiments, the filter strength setting circuit is configured to set the filter strength for a pixel to a third filter strength lower than the second filter strength if the pixel has an edge strength higher than or equal to the second threshold and belongs to an exceptional area of the image.

According to such embodiments, the filter strength for pixels belonging to an exceptional area of the image such as a reflection area of a light source is set to a third filter strength lower than the second filter strength, which helps avoid smoothing of exceptional areas. Consequently, blurring of an exceptional area to render the image artificial is avoided in advance.

In some embodiments, the filter strength setting circuit is configured to set the second filter strength depending on the edge strength so as to decrease with an increase in edge strength if the pixel belongs to an edge area.

According to such embodiments, the filter strength setting circuit is configured to set the second filter strength depending on the edge strength so as to decrease with an increase in edge strength if the pixel belongs to an edge area. Such minute control of the second filter strength depending on the edge strength achieves smooth change of the filter strength of the lowpass filter, in comparison with setting a uniform filter strength for the whole edge area. This avoids rendering the image artificial.

In some embodiments, the range setting circuit is configured to set the allowable range so as to distribute the filter strength in a relatively high range if the spatial frequency of the edge centers on a relatively low frequency domain in the image, and set the allowable range so as to distribute the filter strength in a relatively low range if the spatial frequency of the edge centers on a relatively high frequency domain in the image.

According to such embodiments, for an image in which spatial frequencies of edges center on a relatively low frequency domain (image including many flat areas), an allowable range is set so that the filter strength is distributed in a relatively high range, which removes noise in flat areas efficiently. For an image in which spatial frequencies of edges center on a relatively high frequency domain (image including many middle- to high-frequency edges), an allowable range is set so that the filter strength is distributed in a relatively low range, which helps avoid smoothing of edges. Consequently, in denoising, smoothing of edges is avoided while noise in the flat area is removed efficiently.

An image processing method according to another aspect includes removing noise from an image by a lowpass filter, detecting an edge in the image, calculating an edge strength of each pixel in the image, based on a result of detection from the detecting an edge, analyzing a spatial frequency of the edge based on a result of detection from the detecting an edge, setting an allowable range of the filter strength of the lowpass filter for each image based on a result of analysis from the analyzing a spatial frequency, and setting the filter strength of the lowpass filter within the allowable range set in the setting an allowable range for each pixel based on the edge strength calculated in the calculating an edge strength.

In this aspect, an edge is detected in the image, and the edge strength of each pixel in the image is calculated based on a result of detection. A spatial frequency of an edge is analyzed based on a result of detection, and an allowable range of the filter strength of the lowpass filter is set for each image based on a result of analysis. The filter strength of the lowpass filter is set within the allowable range for each pixel, based on the calculated edge strength. This achieves adaptive change of the filter strength of the lowpass filter for each pixel, depending on the edge strength of each pixel. For example, the filter strength for pixels belonging to a flat area of the image is set relatively high, which removes noise efficiently, while the filter strength for pixels belonging to an edge area of the image is set relatively low, which helps avoid smoothing of edges. Thus edge enhancement is performed on the image from which noise has been efficiently removed, which helps avoid enhancement of noise in edge enhancement. Consequently, noise suppression and edge enhancement are both achieved efficiently. Furthermore, the allowable range of the filter strength of the lowpass filter is adaptively changed for each image depending on the spatial frequencies of edges. This achieves optimal settings of the allowable range of the filter strength depending on the spatial frequencies of edges.

An image processor according to another aspect includes an edge enhancement filter configured to enhance an edge in the image, an edge detection circuit configured to detect the edge in the image, an edge strength calculation circuit configured to calculate an edge strength of each pixel in the image, based on a result of detection by the edge detection circuit, a variation calculation circuit configured to calculate a variation in the image, based on chronologically successive images, and an enhancement strength setting circuit configured to set the edge enhancement strength of the edge enhancement filter for each pixel, based on the edge strength calculated by the edge strength calculation circuit and the variation calculated by the variation calculation circuit.

According to this aspect, the edge detection circuit is configured to detect an edge in an image. The edge strength calculation circuit is configured to calculate an edge strength of each pixel in the image based on a result of detection by the edge detection circuit. The variation calculation circuit is configured to calculate a variation in the image, based on chronologically successive images. The enhancement strength setting circuit is configured to set the edge enhancement strength of the edge enhancement filter for each pixel, based on the edge strength calculated by the edge strength calculation circuit and the variation calculated by the variation calculation circuit. This achieves adaptive change of the enhancement strength of the edge enhancement filter for each pixel depending on the edge strength of each pixel and the variation in the image. For example, the enhancement strength for pixels belonging to a flat area of the image is set relatively low, which helps avoid enhancement of noise, while the enhancement strength for pixels belonging to an edge area of the image is set relatively high, which effectively enhances the edge. Consequently, since enhancement of noise is avoided while edges are enhanced, noise suppression and edge enhancement are both achieved efficiently. Furthermore, the enhancement strength of the edge enhancement filter is adaptively changed depending on the variation in the image. This achieves appropriate settings of the enhancement strength of the edge enhancement filter depending on the variation in the image.

In some embodiments, the enhancement strength setting circuit is configured to set the enhancement strength for a pixel to a first enhancement strength if the pixel has an edge strength lower than a first threshold and belongs to a flat area of the image, and set the enhancement strength for a pixel to a second enhancement strength higher than the first enhancement strength if the pixel has an edge strength higher than or equal to the first threshold and belongs to an edge area of the image.

According to such embodiments, the enhancement strength for pixels belonging to a flat area of the image is set to a relatively low first enhancement strength, which helps avoid enhancement of noise in the flat area. The enhancement strength for pixels belonging to an edge area of the image is set to a relatively high second enhancement strength, which effectively enhances edges. Consequently, in edge enhancement, enhancement of noise is avoided while edges are enhanced.

In some embodiments, the enhancement strength setting circuit is configured to set the first enhancement strength depending on the edge strength so as increase with an increase in edge strength if the pixel belongs to a flat area adjacent to an edge area.

According to such embodiments, the enhancement strength setting circuit is configured to set an enhancement strength for pixels belonging to a flat area adjacent to an edge area to a first enhancement strength depending on the edge strength so that the enhancement strength increases with an increase in edge strength. Such minute control of the first enhancement strength for a boundary area between edge and flat areas depending on the edge strength achieves smooth change of the enhancement strength of the edge enhancement filter, in comparison with setting a uniform enhancement strength for the whole flat area. This avoids rendering the image artificial in a boundary area between edge and flat areas.

In some embodiments, the enhancement strength setting circuit is configured to set the enhancement strength for a pixel to the second enhancement strength if the pixel belongs to an edge area of the image in which the variation is smaller than a predetermined value, and set the enhancement strength for a pixel to a third enhancement strength higher than the second enhancement strength if the pixel belongs to an edge area of the image in which a variation is greater than or equal to the predetermined value.

According to such embodiments, in setting an enhancement strength for pixels belonging to an edge area, the enhancement strength for an image in which the variation is greater than or equal to a predetermined value (image with a large motion) is set to an enhancement strength higher than that of an image (image with a small motion) in which the variation is smaller than the predetermined value, which helps avoid blurred edges due to motion.

In some embodiments, the enhancement strength setting circuit is configured to set the enhancement strength for a pixel to a fourth enhancement strength higher than the second enhancement strength if the pixel has an edge strength higher than or equal to the second threshold and belongs to an exceptional area of the image.

According to such embodiments, the enhancement strength for pixels belonging to an exceptional area of the image such as a reflection area of a light source is set to the fourth enhancement strength higher than the second enhancement strength, which effectively enhances the exceptional area. Consequently, the exceptional area is effectively sharpened.

In some embodiments, the enhancement strength setting circuit is configured to set the enhancement strength for a pixel to the fourth enhancement strength if the pixel belongs to the exceptional area of the image in which the variation is smaller than a predetermined value, and set the enhancement strength for a pixel to a fifth enhancement strength higher than the fourth enhancement strength if the pixel belongs to the exceptional area of the image in which the variation is greater than or equal to the predetermined value.

According to such embodiments, in setting an enhancement strength for pixels belonging to an exceptional area, the enhancement strength for an image in which the variation is greater than or equal to a predetermined value (image with a large motion) is set to an enhancement strength higher than that of an image in which the variation is smaller than the predetermined value (image with a small motion), which helps avoid blurred exceptional areas due to motion.

In some embodiments, the image processor further includes a highpass filter connected in a stage preceding the edge enhancement filter and a filter strength setting circuit configured to set a filter strength of the highpass filter for each image based on the spatial frequency of edge.

According to such embodiments, the highpass filter connected in a preceding stage of the edge enhancement filter helps avoid enhancement of low-frequency noise by the edge enhancement filter. The filter strength setting circuit is configured to set a filter strength of the highpass filter for each image based on spatial frequencies of edges. This achieves adaptive change of the allowable range of the filter strength of the highpass filter for each image depending on spatial frequencies of edges.

In some embodiments, the filter strength setting circuit is configured to set the filter strength so as to realize a relatively low cut-off frequency if the spatial frequency of edge centers on a relatively low frequency domain in the image, and set the filter strength so as to realize a relatively high cut-off frequency if the spatial frequency of the edge centers on a relatively high frequency domain in the image.

According to such embodiments, for an image in which spatial frequencies of edges center on a relatively low frequency domain (image including many low-frequency edges), the filter strength is set so as to realize a relatively low cut-off frequency for allowing low-frequency edges to pass through the highpass filter, which achieves enhancement of low-frequency edges by the edge enhancement filter. For an image in which spatial frequencies of edges center on a relatively high frequency domain (image including many middle- to high-frequency edges), the filter strength is set so as to realize a relatively high cut-off frequency for allowing the highpass filter to shut low-frequency noise, which helps avoid enhancement of low-frequency noise by the edge enhancement filter. Middle- to high-frequency edges pass through the highpass filter and thus are effectively enhanced by the edge enhancement filter.

An image processing method according to another aspect includes enhancing an edge in the image, detecting an edge in the image, calculating an edge strength of each pixel in the image based on a result of detection in the detecting an edge, calculating a variation in the image based on chronologically successive images, and setting an edge enhancement strength of an edge enhancement filter for each pixel, based on the edge strength calculated in the calculating an edge strength and the variation calculated in the calculating a variation.

In this aspect, an edge is detected in the image, the edge strength of each pixel in the image is calculated based on a result of detection, and a variation in the image is calculate based on chronologically successive images. An edge enhancement strength of the edge enhancement filter is set for each pixel, based on the calculated edge strength and the calculated variation and. This achieves adaptive change of the enhancement strength of the edge enhancement filter for each pixel depending on the edge strength of each pixel and the variation in the image. For example, the enhancement strength for pixels belonging to a flat area of the image is set relatively low, which helps avoid enhancement of noise, while the enhancement strength for pixels belonging to an edge area of the image is set relatively high, which effectively enhances the edge. Consequently, since enhancement of noise is avoided while edges are enhanced, noise suppression and edge enhancement are both achieved efficiently. Furthermore, the enhancement strength of the edge enhancement filter is adaptively changed depending on the variation in the image. This achieves appropriate settings of the enhancement strength of the edge enhancement filter depending on the variation in the image.

Some embodiments of the present invention achieve both noise suppression and edge enhancement efficiently.

DESCRIPTION OF EMBODIMENTS

Embodiments of the present invention are described in detail below referring to the drawings. It should be noted that identical reference numerals throughout the drawings indicate identical or equivalent elements.

FIG. 1 is a diagram illustrating a configuration of an image processor 1 according to an embodiment of the present disclosure. As illustrated in FIG. 1, the image processor 1 includes a denoising unit 2, a color space converter 3 connected in a stage subsequent to the denoising unit 2, and an edge enhancement unit 4 connected in a stage subsequent to the color space converter 3. The image processor 1 performs denoising, color space conversion, and edge enhancement in this order on image data of moving image input from, for example, an external video camera.

The denoising unit 2 receives an input of image data including color data (image data of RGrGbB color space in Bayer array in the example of the present embodiment). The denoising unit 2 may include suitable logic, circuitry, interfaces, and/or code that may be operable to perform denoising on the input image.

The color space converter 3 may include suitable logic, circuitry, interfaces, and/or code that may be operable to convert the image data of RGrGbB color space input from the denoising unit 2 into image data including luminance and chrominance data (image data of YUV color space in the example of the present embodiment).

The edge enhancement unit 4 may include suitable logic, circuitry, interfaces, and/or code that may be operable to perform edge enhancement on the image data of YUV color space input from the color space converter 3.

Figure 2:
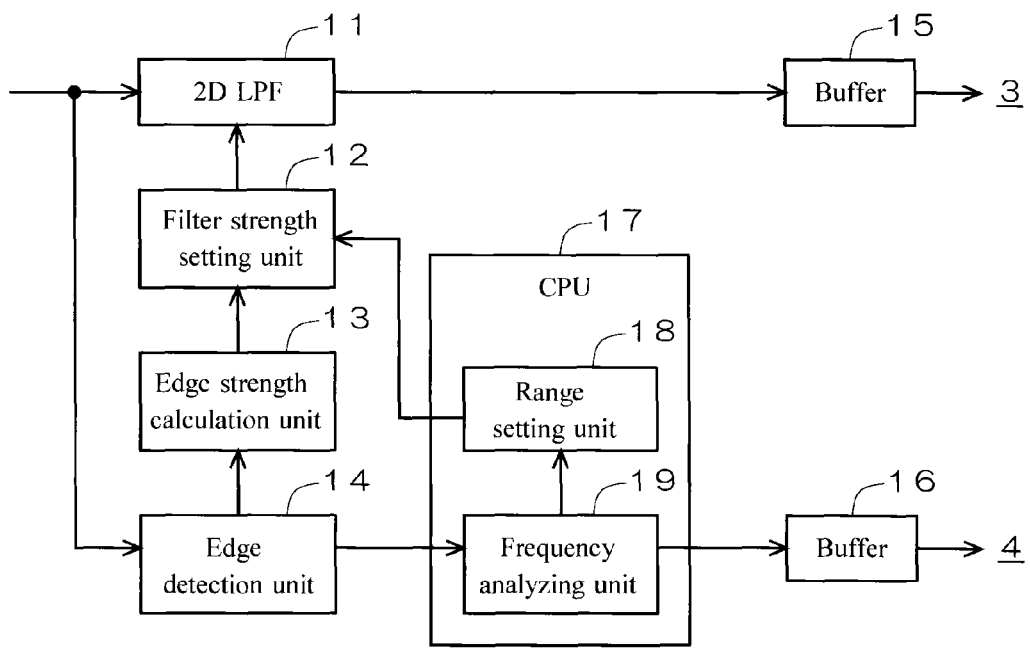
FIG. 2 is a diagram illustrating a configuration of the denoising unit.

FIG. 2 is a diagram illustrating a configuration of the denoising unit 2. FIG. 2 illustrates a relation of connection of the denoising unit 2 including a two-dimensional lowpass filter 11, a filter strength setting unit 12, an edge strength calculation unit 13, an edge detection unit 14, and buffers 15 and 16, which are all configured as hardware. The denoising unit 2 also includes a CPU 17 that may be operable as range setting unit 18 and frequency analyzing unit 19. The range setting unit 18 and frequency analyzing unit 19 may be configured as hardware.

The two-dimensional lowpass filter 11 may include suitable logic, circuitry, interfaces, and/or code, examples of which include a 13-tap programmable filter (FIR filter). The edge detection unit 14 may include suitable logic, circuitry, interfaces, and/or code, examples of which include a 5-tap Sobel filter.

Figure 3:
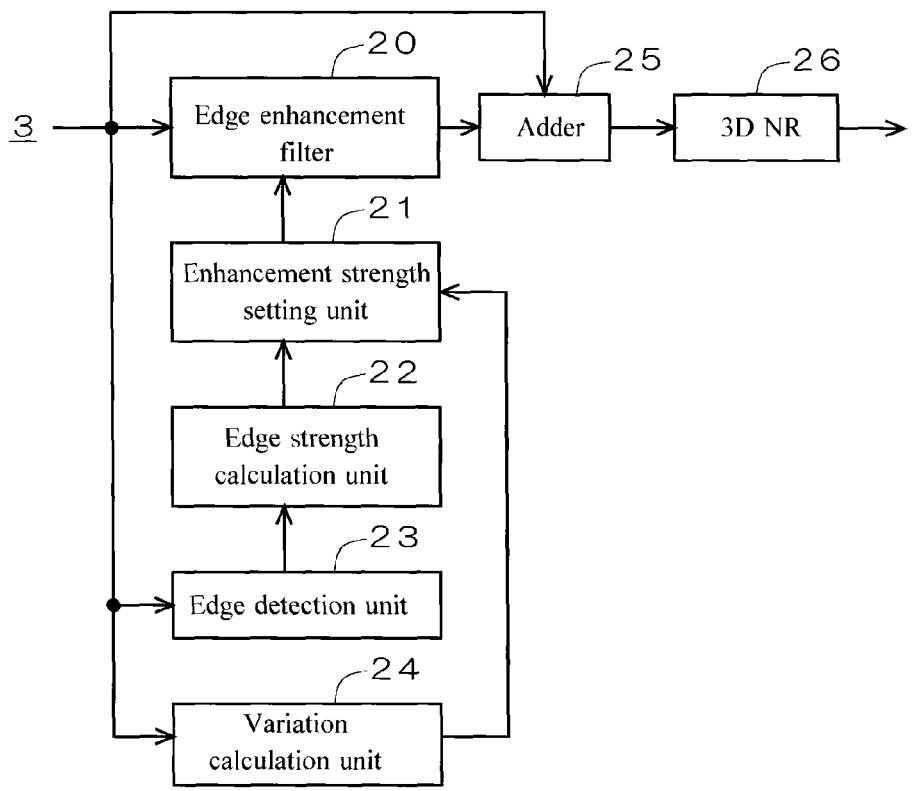
FIG. 3 is a diagram illustrating a configuration of the edge enhancement unit.

FIG. 3 is a diagram illustrating a configuration of the edge enhancement unit 4. FIG. 3 illustrates a relation of connection of the edge enhancement unit 4 including an edge enhancement filter 20, an enhancement strength setting unit 21, an edge strength calculation unit 22, an edge detection unit 23, a variation calculation unit 24, an adder 25, and a three-dimensional noise reduction filter 26, which are all configured as hardware.

The edge enhancement filter 20 may include suitable logic, circuitry, interfaces, and/or code, examples of which include a 13-tap programmable filter. The edge detection unit 23 may include suitable logic, circuitry, interfaces, and/or code, examples of which include a 5-tap Sobel filter. Examples of the three-dimensional noise reduction filter 26 include a motion-adaptive filter having a smaller circuit size than a motion-compensation filter.

Referring to FIGS. 1 to 3, description is given below of an operation of the image processor 1 according to the present embodiment.

Referring to FIG. 2, image data to be processed by the denoising unit 2 is input to the two-dimensional lowpass filter 11 and the edge detection unit 14.

The edge detection unit 14 detects edges in each pixel included in one frame of the image in eight directions (four directions of up, down, left, and right, and four oblique directions). The edge detection unit 14 performs edge detection only on one component of the RGrGbB color space (for example, Gr component). Edge detection on two or more components (for example, Gr and Gb components), however, may be performed to achieve higher accuracy.

The edge strength calculation unit 13 may include suitable logic, circuitry, interfaces, and/or code that may be operable to calculate the edge strength of each pixel on the basis of edge detection by the edge detection unit 14. For example, the edge strength of each pixel is calculated by obtaining a square root of total edge strength in eight directions of each pixel.

The frequency analyzing unit 19 may include suitable logic, circuitry, interfaces, and/or code that may be operable to analyze spatial frequencies of edges in the image, on the basis of edge detection by the edge detection unit 14. Frequency analysis can be performed by a common analytical method such as two-dimensional Fourier transform. Information on the spatial frequencies of edges in each image analyzed by the frequency analyzing unit 19 is input to the range setting unit 18 and the buffer 16. Since the spatial frequencies of the whole one frame need to be analyzed, results of analysis by the frequency analyzing unit 19 regarding a current frame is used for settings of the following frame, and results of analysis regarding the previous frame is used for settings of the current frame. The image to be analyzed by the frequency analyzing unit 19 is not limited to an image after edge detection, but may be an input image before edge detection. Instead of analyzing the spatial frequencies of the whole one frame, spatial frequency analysis may be performed on one area (for example, one area of 9-way split frame) including a feature area of the image, which achieves reduction in circuit size.

The range setting unit 18 may include suitable logic, circuitry, interfaces, and/or code that may be operable to set an allowable range (allowable upper and lower limits) of the filter strength of the two-dimensional lowpass filter 11 for each image for below-described flat and edge areas of the image, on the basis of results of analysis by the frequency analyzing unit 19. For example, in order to set a filter strength of the two-dimensional lowpass filter 11 with a cut-off frequency (Fc), allowable upper and lower limits of the cut-off frequency are set for each image, depending on a frequency domain on which spatial frequencies of edges center.

In the example of the present embodiment, the range setting unit 18 sets the cut-off frequency in the range of 0.2 to 0.3 times a sampling frequency (Fs), if the spatial frequencies of edges center on low- to middle-frequency domains. If the spatial frequencies of edges center on middle- to high-frequency domains, the cut-off frequency is set in the range of 0.3 to 0.4 times the sampling frequency. If the spatial frequencies of edges center on a low-frequency domain, the cut-off frequency is set in the range of 0.1 to 0.2 times the sampling frequency. In other words, the range setting unit 18 sets the allowable range so that the filter strength is distributed in a relatively high range for an image in which spatial frequencies of edges center on a relatively low frequency domain, while setting the allowable range so that the filter strength is distributed in a relatively low range for an image in which spatial frequencies of edges center on a relatively high frequency domain. If the spatial frequencies of edges are widely decentralized across low- to high-frequency domains, the range setting unit 18 sets the cut-off frequency in the range of 0.1 to 0.4 times the sampling frequency. In other words, the range setting unit 18 sets the allowable range so that the filter strength is distributed in a wide range, for an image in which spatial frequencies of edges are widely decentralized across frequency domains.

The filter strength setting unit 12 may include suitable logic, circuitry, interfaces, and/or code that may be operable to set a filter strength of the two-dimensional lowpass filter 11 for each pixel within the allowable range set by the range setting unit 18, on the basis of the edge strength of each pixel calculated by the edge strength calculation unit 13.

Figure 4:
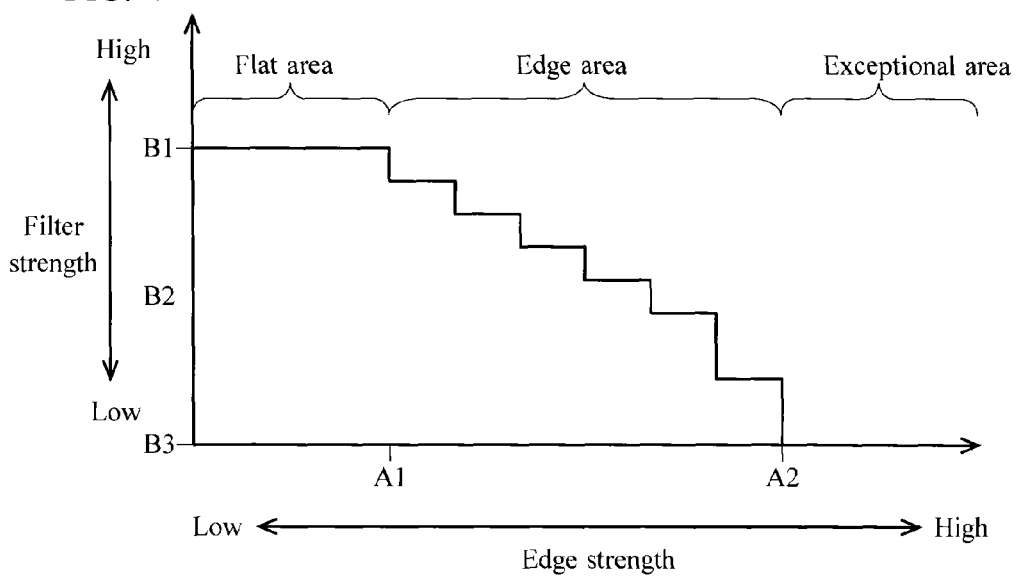
FIG. 4 is a diagram illustrating an example of setting of a filter strength by the filter strength setting unit.

FIG. 4 is a diagram illustrating an example of setting of a filter strength by the filter strength setting unit 12. The filter strength setting unit 12 sets the filter strength to a filter strength B1 equal to the allowable upper limit, for a pixel having an edge strength lower than a first threshold A1 (pixel belonging to a flat area of the image). For a pixel having an edge strength higher than or equal to the threshold A1 and lower than a second threshold A2 (pixel belonging to an edge area of the image), the filter strength setting unit 12 sets the filter strength to a filter strength B2 lower than the filter strength B1 and higher than or equal to the allowable lower limit. For a pixel having an edge strength higher than or equal to the threshold A2 (pixel belonging to an exceptional area of the image such as a reflection area of a light source), the filter strength setting unit 12 sets the filter strength to a filter strength B3 lower than the allowable lower limit (zero in the example of FIG. 4). As illustrated in FIG. 4, the filter strength setting unit 12 sets the filter strength B2 stepwise (six steps in the example of FIG. 4) depending on the edge strength so that the filter strength decreases with an increase in edge strength, for a pixel belonging to the edge area.

The two-dimensional lowpass filter 11 processes each pixel of the input image on a component basis of R, Gr, Gb, and B, with the filter strength set for each pixel by the filter strength setting unit 12. Lowpass filtering with a desired strength is realized by preparing a table of multiple filter coefficients corresponding to multiple filter strengths in advance and selecting the filter coefficient corresponding to the filter strength set by the filter strength setting unit 12 to apply to the two-dimensional lowpass filter 11.

The image data denoised by the two-dimensional lowpass filter 11 is input to the buffer 15.

Referring to FIG. 1, the color space converter 3 converts image data of Bayer space input from the buffer 15 into image data of YUV color space.

Referring to FIG. 3, image data to be processed by the edge enhancement unit 4 is input to the edge enhancement filter 20, the edge detection unit 23, the variation calculation unit 24, and the adder 25.

The edge detection unit 23 detects edges in each pixel included in one frame of the image in eight directions (four directions of up, down, left, and right, and four oblique directions). The edge detection unit 23 performs edge detection only on Y component of the YUV color space.

The edge strength calculation unit 22 may include suitable logic, circuitry, interfaces, and/or code that may be operable to calculate the edge strength of each pixel on the basis of the results of edge detection by the edge detection unit 23. For example, the edge strength of each pixel is calculated by obtaining a square root of total edge strength in eight directions of each pixel.

The variation calculation unit 24 may include suitable logic, circuitry, interfaces, and/or code that may be operable to calculate a variation in an image on the basis of chronologically successive images. For example, a sum of absolute differences of pixel values of all pixels between current and previous frames is obtained to calculate a variation of the current frame from the previous frame. The variation calculation unit 24 performs variation calculation only on Y component of the YUV color space. Alternatively, the variation in an image may be calculated by obtaining a sum of absolute differences of pixel values for each block having a predetermined number of pixels (for example, 8×8 pixels) and obtaining a total sum of the sums of absolute differences of all blocks in one frame. Since the pixel values of the whole one frame are required, results of variation calculation regarding a current frame is used for settings of the following frame, and results of variation calculation regarding the previous frame is used for settings of the current frame. Instead of calculating the variation in the image from the pixel values of the whole one frame, variation in the image may be calculated on the basis of pixel values of one area (for example, one area of 9-way split frame) including a feature area of the image, which achieves reduction in circuit size.

The enhancement strength setting unit 21 may include suitable logic, circuitry, interfaces, and/or code that may be operable to set an edge enhancement strength of the edge enhancement filter 20 for each pixel, on the basis of the edge strength calculated by the edge strength calculation unit 22 and the variation calculated by the variation calculation unit 24.

Figure 5:
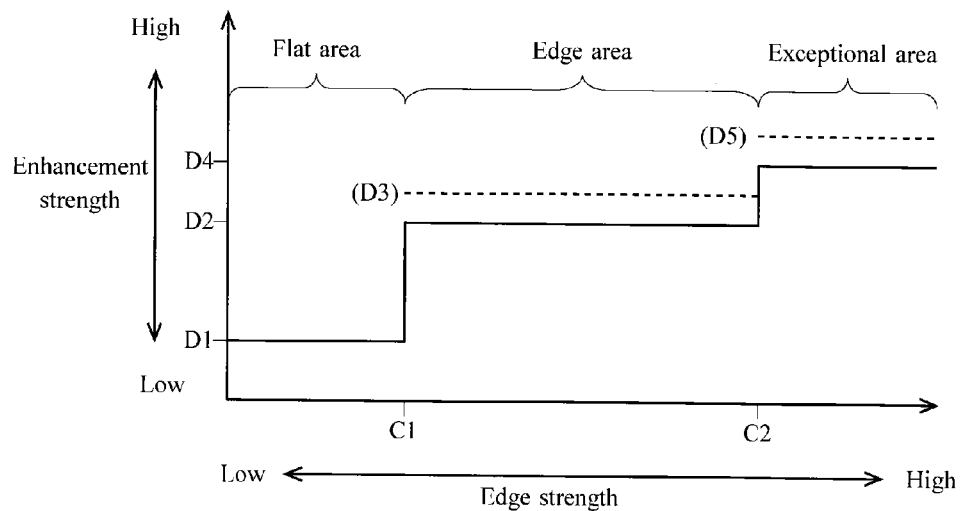
FIG. 5 is a diagram illustrating an example of setting of an enhancement strength by the enhancement strength setting unit.

FIG. 5 is a diagram illustrating an example of setting of an enhancement strength by the enhancement strength setting unit 21. The enhancement strength setting unit 21 sets the enhancement strength to an enhancement strength D1 (for example, 0.5 times), for a pixel having an edge strength lower than a first threshold C1 (pixel belonging to a flat area of the image).

For a pixel having an edge strength higher than or equal to the threshold C1 and lower than a second threshold C2 (pixel belonging to an edge area of the image), the enhancement strength setting unit 21 sets the enhancement strength to an enhancement strength D2 (for example, 1.0 times) higher than the enhancement strength D1 if the variation in the image is smaller than a predetermined value, while setting the enhancement strength to an enhancement strength D3 (for example, 1.2 times) higher than the enhancement strength D2 if the variation in the image is greater than or equal to the predetermined value.

For a pixel having an edge strength higher than or equal to the threshold C2 (pixel belonging to an exceptional area of the image), the enhancement strength setting unit 21 sets the enhancement strength to an enhancement strength D4 (for example, 1.2 times) higher than the enhancement strength D2 if the variation in the image is smaller than the predetermined value, while setting the enhancement strength to an enhancement strength D5 (for example, 1.44 times) higher than the enhancement strength D4 if the variation in the image is greater than or equal to the predetermined value.

For edge and exceptional areas, different enhancement strengths are employed depending on whether the variation in the image is greater than or equal to a predetermined value or not, but for flat areas, which are barely blurred due to motion, enhancement strengths are not necessarily different depending on the variation in the image.

Figure 6:
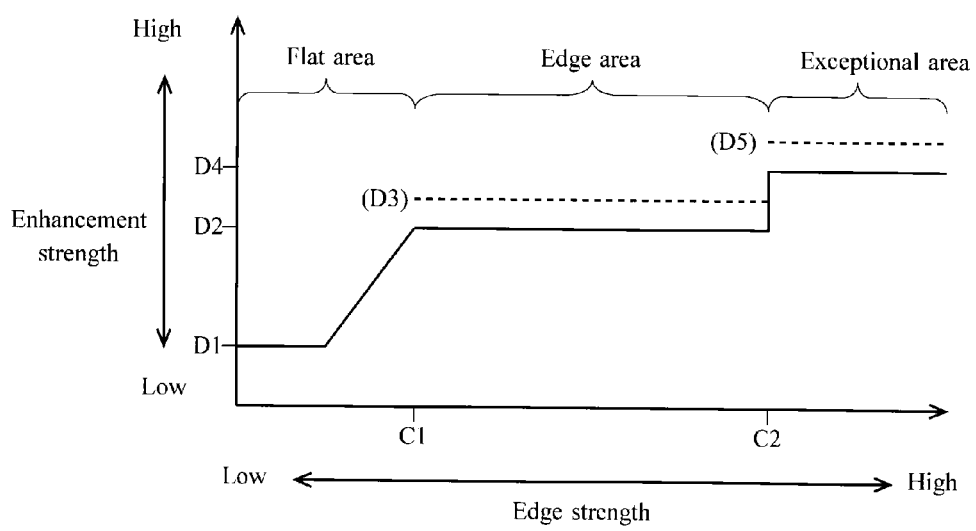
FIG. 6 is a diagram illustrating another example of setting of an enhancement strength by the enhancement strength setting unit.

FIG. 6 is a diagram illustrating another example of setting of an enhancement strength by the enhancement strength setting unit 21. The enhancement strength setting unit 21 sets the enhancement strength depending on the edge strength for a pixel belonging to a flat area adjacent to an edge area, so that the enhancement strength linearly increases with an increase in edge strength. A complicated image having tangled flat and edge areas may appear artificial in the boundary area when there is a big difference in enhancement strength between the flat and edge areas. In processing such a complicated image, employing a setting method as illustrated in FIG. 6 achieves smooth depiction of a boundary area between flat and edge areas. This processing is not necessary for a boundary area between edge and exceptional areas, since change in edge strength in such area is intrinsically big and not as small as that in a boundary area between flat and edge areas.

The edge enhancement filter 20 performs enhancement on Y component of each pixel of the input image with an enhancement strength set for each pixel by the enhancement strength setting unit 21.

The adder 25 adds the input image of YUV color space and the edge-enhanced image of Y component input from the edge enhancement filter 20 together, so as to output edge-enhanced image data of YUV color space.

The three-dimensional noise reduction filter 26 performs motion-adaptive noise reduction on the image data input from the adder 25. The three-dimensional noise reduction filter 26 thereby removes residual noise that has not been removed by the denoising unit 2 even when that noise has been unnecessarily enhanced by the edge enhancement unit 4.

First Modification

Figure 7:
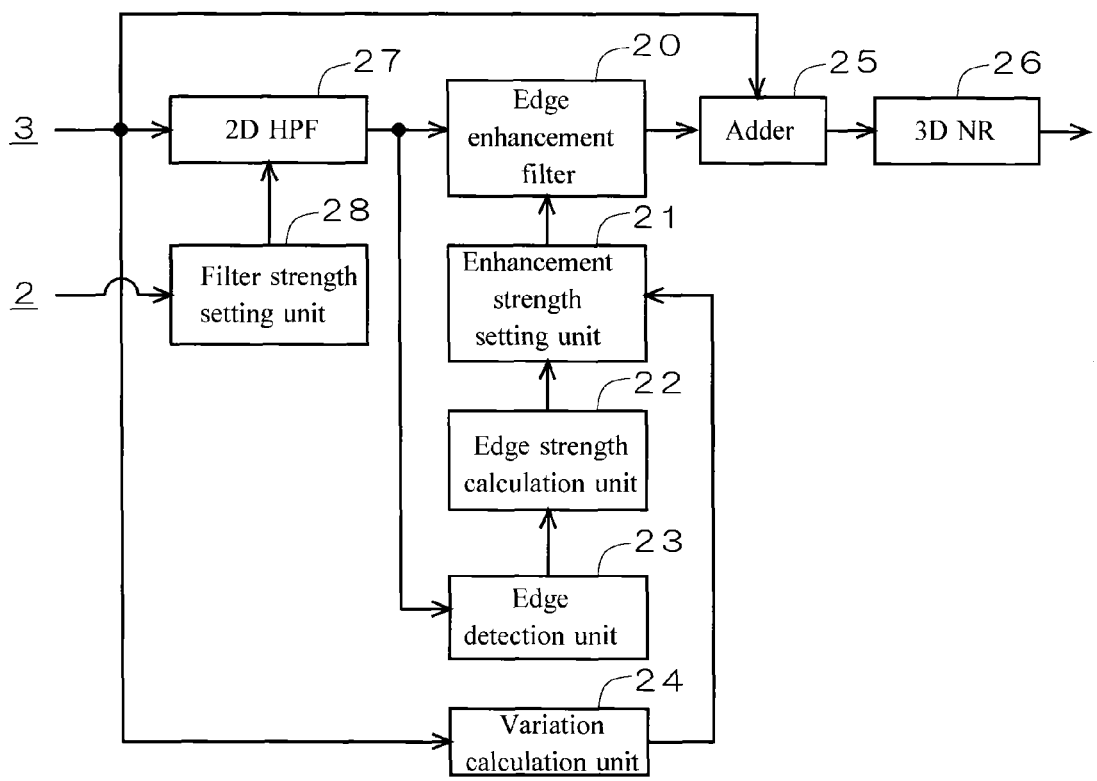
FIG. 7 is a diagram illustrating a configuration of the edge enhancement unit according to a first modification.

FIG. 7 is a diagram illustrating a configuration of the edge enhancement unit 4 according to a first modification. A two-dimensional highpass filter 27 and a filter strength setting unit 28 are added to the configuration illustrated in FIG. 3. The two-dimensional highpass filter 27 may include suitable logic, circuitry, interfaces, and/or code, examples of which include a 17-tap programmable filter. The output of the two-dimensional highpass filter 27 is connected to the inputs of the edge enhancement filter 20 and the edge detection unit 23. The input of the edge detection unit 23 may alternatively connected to the input of the two-dimensional highpass filter 27.

The filter strength setting unit 28 receives an input of information on spatial frequencies of edges analyzed by the frequency analyzing unit 19 via the buffer 16. The filter strength setting unit 28 may include suitable logic, circuitry, interfaces, and/or code that may be operable to set a cut-off frequency of the two-dimensional highpass filter 27 to, for example, ½ of cut-off frequency equal to the allowable upper limit of the strength set to the two-dimensional lowpass filter 11. In the present modification, the filter strength setting unit 28 sets the cut-off frequency to 0.1 times the sampling frequency, if the spatial frequencies of edges center on low- to middle-frequency domains. If the spatial frequencies of edges center on middle- to high-frequency domains, the cut-off frequency is set to 0.15 times the sampling frequency. If the spatial frequencies of edges center on a low-frequency domain, the cut-off frequency is set to 0.05 times the sampling frequency. In other words, the filter strength setting unit 28 sets the filter strength so as to realize a relatively low cut-off frequency for an image in which spatial frequencies of edges center on a relatively low frequency domain, while setting the filter strength so as to realize a relatively high cut-off frequency for an image in which spatial frequencies of edges center on a relatively high frequency domain.

Since the two-dimensional highpass filter 27 is a programmable filter, it may function as a lowpass filter or a band-pass filter to shut a frequency domain in which a noise component exists. For example, if a noise component exists in a high-frequency domain, the programmable filter may function as a lowpass filter to shut the noise in the high-frequency domain.

Second Modification

Figure 8:
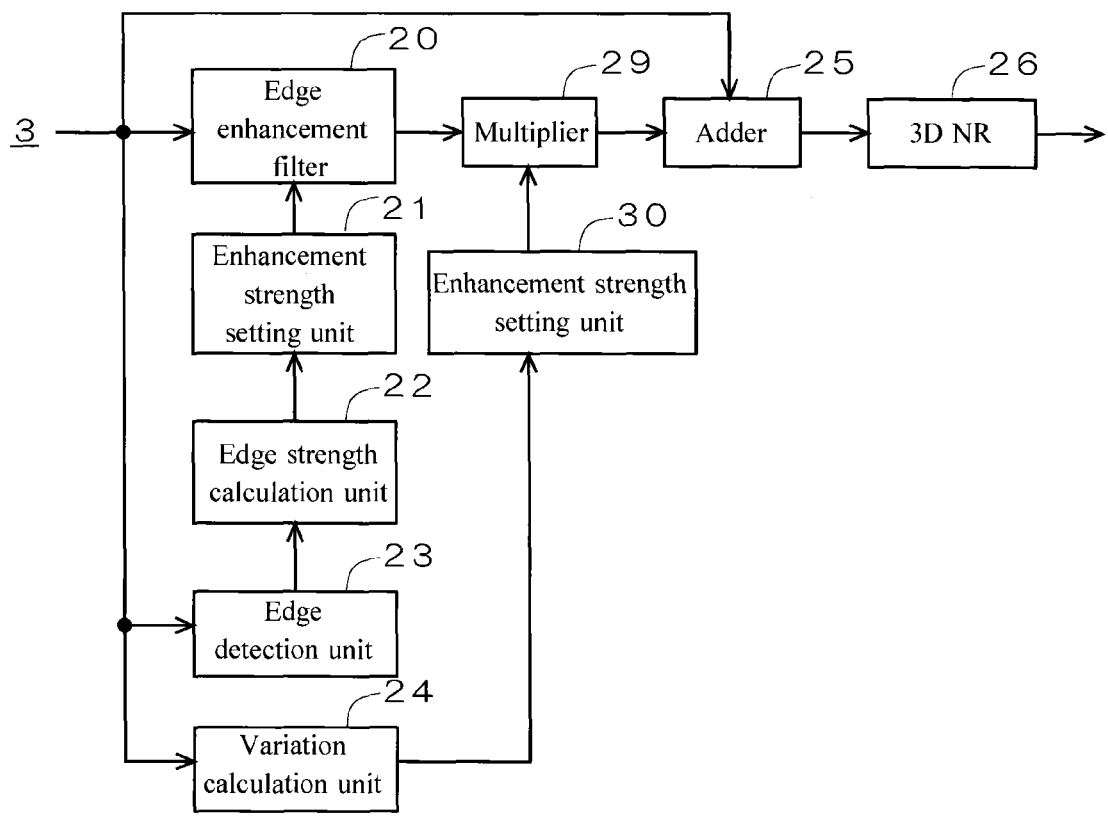
FIG. 8 is a diagram illustrating a configuration of the edge enhancement unit according to a second modification.

FIG. 8 is a diagram illustrating a configuration of the edge enhancement unit 4 according to a second modification. A multiplier 29 and an enhancement strength setting unit 30 are added to the configuration illustrated in FIG. 3.

The enhancement strength setting unit 21 may include suitable logic, circuitry, interfaces, and/or code that may be operable to set an edge enhancement strength of the edge enhancement filter 20 for each pixel, on the basis of the edge strength calculated by the edge strength calculation unit 22.

The enhancement strength setting unit 30 sets a multiplication coefficient of the multiplier 29 for each image, on the basis of the variation in the image calculated by the variation calculation unit 24. For example, the multiplication coefficient is set to 1.0 times when the variation in the image is zero, and set so as to increase with an increase in variation.

The edge enhancement filter 20 performs enhancement on Y component of each pixel of the input image with an enhancement strength for each pixel on the basis of the edge strength by the enhancement strength setting unit 21.

The multiplier 29 multiplies the edge-enhanced image of the Y component input from the edge enhancement filter 20 by the multiplication coefficient set for each image on the basis of the variation by the enhancement strength setting unit 30, so as to further enhance the edge.

The adder 25 adds the input image of YUV color space and the edge-enhanced image of Y component input from the multiplier 29 together, so as to output edge-enhanced image data of YUV color space.

Recapitulation

According to the image processor 1 in the above embodiment, the edge detection unit 14 (first edge detection circuit) detects an edge in an image, and the edge strength calculation unit 13 (first edge strength calculation circuit) calculates the edge strength of each pixel in the image, on the basis of the results of detection by the edge detection unit 14. The filter strength setting unit 12 (first filter strength setting circuit) sets the filter strength of the two-dimensional lowpass filter 11 for each pixel on the basis of the edge strength calculated by the edge strength calculation unit 13. This achieves adaptive change of the filter strength of the two-dimensional lowpass filter 11 for each pixel, depending on the edge strength of each pixel. For example, the filter strength for pixels belonging to a flat area of the image is set relatively high, which removes noise efficiently, while the filter strength for pixels belonging to an edge area of the image is set relatively low, which helps avoid smoothing of edges. Thus edge enhancement is performed by the edge enhancement unit 4 on the image from which noise has been efficiently removed by the denoising unit 2, which helps avoid enhancement of noise in edge enhancement. Consequently, noise suppression and edge enhancement are both achieved efficiently.

According to the image processor 1 in the above embodiment, the edge detection unit 23 (second edge detection circuit) detects edges in the image and the edge strength calculation unit 22 (second edge strength calculation circuit) calculates the edge strength of each pixel in the image on the basis of the results of detection by the edge detection unit 23. The enhancement strength setting unit 21 sets an edge enhancement strength of the edge enhancement filter 20 for each pixel on the basis of the edge strength calculated by the edge strength calculation unit 22. This achieves adaptive change of the enhancement strength of the edge enhancement filter 20 for each pixel depending on the edge strength of each pixel. For example, the enhancement strength for pixels belonging to a flat area of the image is set relatively low, which helps avoid enhancement of residual noise, while the enhancement strength for pixels belonging to an edge area of the image is set relatively high, which effectively enhances the edge. Consequently, since enhancement of noise is avoided while edges are enhanced, noise suppression and edge enhancement are both achieved efficiently.

According to the image processor 1 in the above embodiment, as illustrated in FIG. 4, the filter strength for pixels belonging to a flat area of the image is set to a relatively high first filter strength B1, which removes noise in the flat area efficiently. The filter strength for pixels belonging to an edge area of the image is set to a relatively low second filter strength B2, which helps avoid smoothing of edges. Consequently, in denoising, smoothing of edges is avoided while noise in the flat area is removed efficiently.

According to the image processor 1 in the above embodiment, as illustrated in FIG. 4, the filter strength for pixels belonging to an exceptional area of the image such as a reflection area of a light source is set to a third filter strength B3 lower than the second filter strength B2, which helps avoid smoothing of exceptional areas. Consequently, blurring of an exceptional area to render the image artificial is avoided in advance.

According to the image processor 1 in the above embodiment, as illustrated in FIG. 4, the filter strength setting unit 12 sets the second filter strength B2 depending on an edge strength of pixels belonging to an edge areas so that the filter strength decreases with an increase in edge strength. Such minute control of the second filter strength B2 depending on the edge strength achieves smooth change of the filter strength of the two-dimensional lowpass filter 11, in comparison with setting a uniform filter strength for the whole edge area. This helps avoid rendering the image artificial.

According to the image processor 1 in the above embodiment, the frequency analyzing unit 19 analyzes spatial frequencies of edges on the basis of results of detection by the edge detection unit 14, and the range setting unit 18 sets an allowable range of the filter strength of the two-dimensional lowpass filter 11 for each image on the basis of results of analysis by the frequency analyzing unit 19. The filter strength setting unit 12 sets the filter strength of the two-dimensional lowpass filter 11 for each pixel within the allowable range set by the range setting unit 18, on the basis of the edge strength calculated by the edge strength calculation unit 13. This achieves adaptive change of the allowable range of the filter strength of the two-dimensional lowpass filter 11 for each image depending on spatial frequencies of edges.

According to the image processor 1 in the above embodiment, for an image in which spatial frequencies of edges center on a relatively low frequency domain (image including many flat areas), an allowable range is set so that the filter strength is distributed in a relatively high range, which removes noise in flat areas efficiently. For an image in which spatial frequencies of edges center on a relatively high frequency domain (image including many middle- to high-frequency edges), an allowable range is set so that the filter strength is distributed in a relatively low range, which helps avoid smoothing of edges. Consequently, in denoising, smoothing of edges is avoided while noise in the flat area is removed efficiently.

According to the image processor 1 in the above embodiment, the variation calculation unit 24 calculates a variation in an image on the basis of chronologically successive images. The enhancement strength setting unit 21 sets an edge enhancement strength of the edge enhancement filter 20 for each pixel, on the basis of the edge strength calculated by the edge strength calculation unit 22 and the variation calculated by the variation calculation unit 24. This achieves adaptive change of the enhancement strength of the edge enhancement filter 20 for each pixel depending on the edge strength of each pixel and the variation in the image.

According to the image processor 1 in the above embodiment, as illustrated in FIG. 5, the enhancement strength for pixels belonging to a flat area of the image is set to a relatively low first enhancement strength D1, which helps avoid enhancement of noise in the flat area. The enhancement strength for pixels belonging to an edge area of the image is set to a relatively high second enhancement strength D2, which effectively enhances edges. Consequently, in edge enhancement, enhancement of noise is avoided while edges are enhanced.

According to the image processor 1 in the above embodiment, as illustrated in FIG. 6, the enhancement strength setting unit 21 sets an enhancement strength for pixels belonging to a flat area adjacent to an edge area to a first enhancement strength D1 depending on the edge strength so that the enhancement strength increases with an increase in edge strength. Such minute control of the first enhancement strength D1 for a boundary area between edge and flat areas depending on the edge strength achieves smooth change of the enhancement strength of the edge enhancement filter 20, in comparison with setting a uniform enhancement strength for the whole flat area. This helps avoid rendering the image artificial in a boundary area between edge and flat areas.

According to the image processor 1 in the above embodiment, as illustrated in FIG. 5, in setting an enhancement strength for pixels belonging to an edge area, the enhancement strength for an image in which the variation is greater than or equal to a predetermined value (image with a large motion) is set to a third enhancement strength D3 higher than that of an image (image with a small motion) in which the variation is smaller than the predetermined value, which helps avoid blurred edges due to motion.

According to the image processor 1 in the above embodiment, as illustrated in FIG. 5, the enhancement strength for pixels belonging to an exceptional area of the image such as a reflection area of a light source is set to a fourth enhancement strength D4 higher than the second enhancement strength D2, which effectively enhances the exceptional area. Consequently, the exceptional area is effectively sharpened.

According to the image processor 1 in the above embodiment, as illustrated in FIG. 5, in setting an enhancement strength for pixels belonging to an exceptional area, the enhancement strength for an image in which the variation is greater than or equal to a predetermined value (image with a large motion) is set to a fifth enhancement strength D5 higher than that of an image in which the variation is smaller than the predetermined value (image with a small motion), which helps avoid blurred exceptional areas due to motion.

According to the image processor 1 in the above first modification, the two-dimensional highpass filter 27 connected in a preceding stage of the edge enhancement filter 20 helps avoid enhancement of low-frequency noise by the edge enhancement filter 20. The filter strength setting unit 28 (second filter strength setting circuit) sets a filter strength of the two-dimensional highpass filter 27 for each image on the basis of spatial frequencies of edges. This achieves adaptive change of the allowable range of the filter strength of the two-dimensional highpass filter 27 for each image depending on spatial frequencies of edges.

According to the image processor 1 in the above first modification, for an image in which spatial frequencies of edges center on a relatively low frequency domain (image including many low-frequency edges), the filter strength is set so as to realize a relatively low cut-off frequency for allowing low-frequency edges to pass through the two-dimensional highpass filter 27, which achieves enhancement of low-frequency edges by the edge enhancement filter 20. For an image in which spatial frequencies of edges center on a relatively high frequency domain (image including many middle- to high-frequency edges), the filter strength is set so as to realize a relatively high cut-off frequency for allowing the two-dimensional highpass filter 27 to shut low-frequency noise, which helps avoid enhancement of low-frequency noise by the edge enhancement filter 20. Middle- to high-frequency edges pass through the two-dimensional highpass filter 27 and thus are effectively enhanced by the edge enhancement filter 20.

According to the image processor 1 in the above embodiment, the denoising unit 2 processes an image including color data (for example, image in Bayer region) and the edge enhancement unit 4 processes an image including luminance and chrominance data (for example, image of YUV region). Performing such denoising on an image of Bayer region before color space conversion achieves efficient removal of noise in an early stage, and as a consequence, helps prevent noise from propagating during color space conversion.

According to the image processor 1 in the above embodiment, the edge detection unit 14 detects edges in an image, and the edge strength calculation unit 13 calculates the edge strength of each pixel in the image on the basis of the results of detection by the edge detection unit 14. The frequency analyzing unit 19 analyzes spatial frequencies of edges on the basis of the results of detection by the edge detection unit 14, and the range setting unit 18 sets an allowable range of the filter strength of the two-dimensional lowpass filter 11 for each image on the basis of the result of analysis by the frequency analyzing unit 19. The filter strength setting unit 12 sets a filter strength of the two-dimensional lowpass filter 11 for each pixel within the allowable range set by the range setting unit 18, on the basis of the edge strength calculated by the edge strength calculation unit 13. This achieves adaptive change of the filter strength of the two-dimensional lowpass filter 11 for each pixel, depending on the edge strength of each pixel. For example, the filter strength for pixels belonging to a flat area of the image is set relatively high, which removes noise efficiently, while the filter strength for pixels belonging to an edge area of the image is set relatively low, which helps avoid smoothing of edges. Thus edge enhancement is performed on the image from which noise has been efficiently removed, which helps avoid enhancement of noise in edge enhancement. Consequently, noise suppression and edge enhancement are both achieved efficiently. Furthermore, the allowable range of the filter strength of the two-dimensional lowpass filter 11 is adaptively changed for each image depending on the spatial frequencies of edges. This achieves optimal settings of the allowable range of the filter strength depending on the spatial frequencies of edges.

According to the image processor 1 in the above embodiment, the edge detection unit 23 detects edges in an image, the edge strength calculation unit 22 calculates the edge strength of each pixel in the image on the basis of the results of detection by the edge detection unit 23, and the variation calculation unit 24 calculates a variation in the image on the basis of chronologically successive images. The enhancement strength setting unit 21 sets an edge enhancement strength of the edge enhancement filter 20 for each pixel, on the basis of the edge strength calculated by the edge strength calculation unit 22 and the variation calculated by the variation calculation unit 24. This achieves adaptive change of the enhancement strength of the edge enhancement filter 20 for each pixel depending on the edge strength of each pixel and the variation in the image. For example, the enhancement strength for pixels belonging to a flat area of the image is set relatively low, which helps avoid enhancement of noise, while the enhancement strength for pixels belonging to an edge area of the image is set relatively high, which effectively enhances the edge. Consequently, since enhancement of noise is avoided while edges are enhanced, noise suppression and edge enhancement are both achieved efficiently. Furthermore, the enhancement strength of the edge enhancement filter 20 is adaptively changed depending on the variation in the image. This achieves appropriate settings of the enhancement strength of the edge enhancement filter 20 depending on the variation in the image.

While the invention has been described in detail, the foregoing description is in all aspects illustrative and not restrictive. It is understood that numerous other modifications and variations can be devised without departing from the scope of the invention.

What is claimed is:

1. An image processor comprising:
a denoising circuit configured to remove noise from an image; and
an edge enhancement circuit connected in a stage subsequent to the denoising circuit and configured to enhance an edge in the image,
the denoising circuit including
a lowpass filter configured to remove noise from the image;
a first edge detection circuit configured to detect an edge in the image;
a first edge strength calculation circuit configured to calculate an edge strength of each pixel in the image based on a result of detection by the first edge detection circuit; and
a first filter strength setting circuit configured to set a filter strength of the lowpass filter for each pixel, based on the edge strength calculated by the first edge strength calculation circuit,
the edge enhancement circuit including
an edge enhancement filter configured to enhance an edge in the image;
a second edge detection circuit configured to detect the edge in the image;
a second edge strength calculation circuit configured to calculate an edge strength of each pixel in the image, based on a result of detection by the second edge detection circuit; and
an enhancement strength setting circuit configured to set an edge enhancement strength of the edge enhancement filter for each pixel, based on the edge strength calculated by the second edge strength calculation circuit.

2. The image processor according to claim 1, wherein the first filter strength setting circuit is configured to
set the filter strength for a pixel to a first filter strength if the pixel has an edge strength lower than a first threshold and belongs to a flat area of the image, and
set the filter strength for a pixel to a second filter strength lower than the first filter strength if the pixel has an edge strength higher than or equal to the first threshold and belongs to an edge area of the image.

3. The image processor according to claim 2, wherein the first filter strength setting circuit is configured to set the filter strength for a pixel to a third filter strength lower than the second filter strength if the pixel has an edge strength higher than or equal to the second threshold and belongs to an exceptional area of the image.

4. The image processor according to claim 2, wherein the first filter strength setting circuit is configured to set the second filter strength depending on the edge strength so as to decrease with an increase in edge strength if the pixel belongs to an edge area.

5. The image processor according to claim 1, wherein the denoising circuit further includes
a frequency analyzing circuit configured to analyze a spatial frequency of the edge based on a result of detection by the first edge detection circuit; and
a range setting circuit configured to set an allowable range of the filter strength of the lowpass filter for each image based on a result of analysis by the frequency analyzing circuit, and the first filter strength setting circuit is configured to set the filter strength of the lowpass filter for each pixel within the allowable range set by the range setting circuit, based on the edge strength calculated by the first edge strength calculation circuit.

6. The image processor according to claim 5, wherein the range setting circuit is configured to set the allowable range so as to distribute the filter strength in a relatively high range if the spatial frequency of the edge centers on a relatively low frequency domain in the image, and set the allowable range so as to distribute the filter strength in a relatively low range if the spatial frequency of the edge centers on a relatively high frequency domain in the image.

7. The image processor according to claim 1, wherein the edge enhancement circuit further includes a variation calculation circuit configured to calculate a variation in the image, based on chronologically successive images, and the enhancement strength setting circuit is configured to set the edge enhancement strength of the edge enhancement filter for each pixel, based on the edge strength calculated by the second edge strength calculation circuit and the variation calculated by the variation calculation circuit.

8. The image processor according to claim 7, wherein the enhancement strength setting circuit is configured to set the enhancement strength for a pixel to a first enhancement strength if the pixel has an edge strength lower than a first threshold and belongs to a flat area of the image, and set the enhancement strength for a pixel to a second enhancement strength higher than the first enhancement strength if the pixel has an edge strength higher than or equal to the first threshold and belongs to an edge area of the image.

9. The image processor according to claim 8, wherein the enhancement strength setting circuit is configured to set the first enhancement strength depending on the edge strength so as increase with an increase in edge strength if the pixel belongs to a flat area adjacent to an edge area.

10. The image processor according to claim 8, wherein the enhancement strength setting circuit is configured to set the enhancement strength for a pixel to the second enhancement strength if the pixel belongs to an edge area of the image in which the variation is smaller than a predetermined value, and set the enhancement strength for a pixel to a third enhancement strength higher than the second enhancement strength if the pixel belongs to an edge area of the image in which a variation is greater than or equal to the predetermined value.

11. The image processor according to claim 8, wherein the enhancement strength setting circuit is configured to set the enhancement strength for a pixel to a fourth enhancement strength higher than the second enhancement strength if the pixel has an edge strength higher than or equal to the second threshold and belongs to an exceptional area of the image.

12. The image processor according to claim 11, wherein the enhancement strength setting circuit is configured to set the enhancement strength for a pixel to the fourth enhancement strength if the pixel belongs to the exceptional area of the image in which the variation is smaller than a predetermined value, and set the enhancement strength for a pixel to a fifth enhancement strength higher than the fourth enhancement strength if the pixel belongs to the exceptional area of the image in which the variation is greater than or equal to the predetermined value.

13. The image processor according to claim 7, wherein the denoising circuit further includes a frequency analyzing circuit configured to analyze a spatial frequency of the edge based on a result of detection by the first edge detection circuit, and the edge enhancement circuit further includes a highpass filter connected in a stage preceding the edge enhancement filter; and a second filter strength setting circuit configured to set a filter strength of the highpass filter for each image, based on a result of analysis by the frequency analyzing circuit.

14. The image processor according to claim 13, wherein the second filter strength setting circuit is configured to set the filter strength so as to realize a relatively low cut-off frequency if the spatial frequency of edge centers on a relatively low frequency domain in the image, and set the filter strength so as to realize a relatively high cut-off frequency if the spatial frequency of the edge centers on a relatively high frequency domain in the image.

15. The image processor according to claim 1, wherein the denoising circuit is configured to process the image including color data, and the edge enhancement circuit is configured to process the image including luminance and chrominance data.

16. An image processing method comprising:

removing noise from an image; and enhancing an edge in the image after the removing noise, the removing noise including removing noise from the image by a lowpass filter;

detecting an edge in the image;

calculating an edge strength of each pixel in the image based on a result of detection in the detecting an edge in the removing noise; and setting a filter strength of the lowpass filter for each pixel, based on the edge strength calculated in the calculating an edge strength in the removing noise, the enhancing an edge including enhancing the edge in the image by an edge enhancement filter;

detecting the edge in the image;

calculating an edge strength of each pixel in the image, based on a result of detection from the detecting the edge in the enhancing an edge; and setting an edge enhancement strength of the edge enhancement filter for each pixel, based on the edge strength calculated in the calculating an edge strength in the enhancing an edge.

* * * * *